Aug. 26, 1952      C. E. ADAMS      2,608,376
VALVE CONSTRUCTION
Filed Sept. 26, 1945

INVENTOR.
Cecil E. Adams
BY
Herschel C. Omohundro
ATTORNEY

Patented Aug. 26, 1952

2,608,376

UNITED STATES PATENT OFFICE 2,608,376

VALVE CONSTRUCTION

Cecil E. Adams, Columbus, Ohio, assignor to The Denison Engineering Company, Columbus, Ohio, a corporation of Ohio Application September 26, 1945, Serial No. 618,646

2 Claims. (Cl. 251—144)

This invention relates to valves and is particularly directed to an improvement in check valves.

An object of this invention is to provide a simple, compact check valve having a minimum number of moving parts and one which will seal effectively, have a long life, and be simple to service, when necessary.

Another object of the invention is to provide a valve having a chambered body in which a flat seat is provided between the inlet and outlet to the chamber and to dispose a second body movably in the chamber to engage and be disengaged from the seat, one of the bodies having a suitable resilient ring as a gasket adjacent the seat.

A further object of the invention is to provide a check valve having a bore which is reduced between its ends to form a shoulder and movably disposing a cylindrical body in the bore for engagement with the shoulder, the end of the body adjacent the shoulder being provided with a groove for the reception of a ring-like gasket having a circular cross section of such diameter that the side of the gasket will engage the seat or shoulder slightly in advance of the engagement of the cylinder therewith, the engagement of the cylinder with the shoulder forming a groove to confine the gasket whereby it will be prevented from being forced into the bore by the fluid pressure existing at the outer edge of the ring or around the cylindrical member.

A still further object is to provide a check valve having a body in which a chamber is formed and with which communicates a pair of passages, the body having a flat shoulder around the inner end of one of the passages, which shoulder is adapted to be engaged by a movable body on which a groove is formed, the body having a flange at one side of the groove, of limited height so that a resilient rubber ring, constituting a gasket may be easily positioned in the groove and retained therein by the flange, the gasket having a circular cross section, the diameter of which is such that when the gasket is engaged with the body at one side of the groove the other side of the gasket will project beyond the flange so that when the body is moved toward the seat surrounding the inner end of the passage, the gasket will be first to engage the seat and before it is appreciably compressed, the flange will engage the seat also to prevent the gasket from being forced or extruded into the end of the passage.

Another object is to provide a check valve having a body with a chamber and inlet and outlet passages communicating therewith, the body also having a seat surrounding the outlet passage with which a movable body is adapted to engage. This movable body has its seat-engaging end relieved to provide a groove for the reception of a gasket having a circular cross section, such gasket being known in the trade as an O ring. The relieved portion of the movable body is slightly undercut to provide a flange which retains the O ring on the movable body, and when the latter engages the seat, a groove will be provided to retain the O ring so that the fluid pressure will be applied through the inlet passage to the outer side of the ring and compress the same in the groove.

Further objects and advantages will be apparent from the following description, reference being had to the accompanying drawings wherein a preferred form of embodiment of the present invention is clearly shown.

Figure 1:
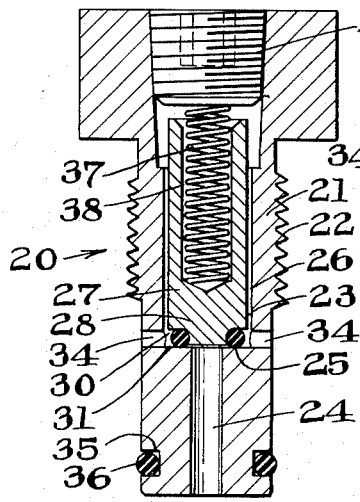
Fig. 1 is a vertical longitudinal sectional view taken through a check valve assembly formed in accordance with the present invention.
Figure 2:
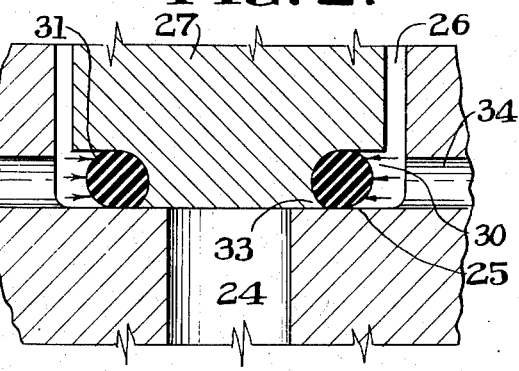
Fig. 2 is a detail fragmentary sectional view taken through the seat and adjoining portions of the check valve showing the same in sealing position.
Figure 5:
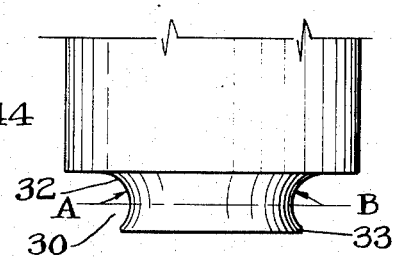
Fig. 5 is a side elevational view of the lower end of a movable sealing element in the valve.

Referring more particularly to the drawings and especially to Figs. 1, 2 and 5 thereof, the complete valve is designated generally by the numeral 20.

In the first form of the invention illustrated, the valve 20 includes a body 21 which is of generally cylindrical form and has threaded section 22 for securing the same to any suitable support, not shown. This support may be a valve body such as shown in my copending application, Serial No. 594,963, filed May 21, 1945, in which a check valve formed in accordance with the present invention has been employed, or any other member where such a check valve is necessary. The body 21 has a longitudinally extending bore 23 formed therein, this bore being reduced as at 24 to provide an annular shoulder 25 which constitutes a seat intermediate of the length of the bore. The larger portion of the bore 23 provides a chamber 26 for the slidable reception of a movable body 27, this body being of cylindrical form and movable lengthwise in the chamber 26. The end 28 of the body 26 nearest the shoulder 25 is relieved as at 30 to provide an annular half-groove for the reception of a ring-like gasket 31. This gasket is preferably composed of a rubber composition and has a circular cross section, such gasket being designated generally in the trade as an O ring. As clearly indicated in Figs. 2 and 5, the half groove or relieved portion 30 is rounded as at 32 to fit the gasket, the center for the rounded portion being located as shown in Fig. 5 in a plane designated by the line A—B which cuts through the end of the body 27 a slight distance from the end. By so forming the lower end of the body 27, a slight overhang or flange 33 is provided which will retain the gasket in the half groove. The gasket will thus move with the body 27 and be precluded from separation from the body.

Figure 4:
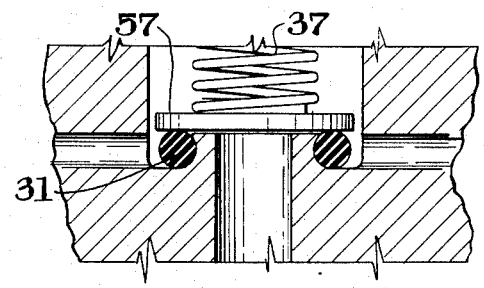
Fig. 4 is a similar view of a further modified form of the valve.

It is within the concept of the invention to form such half groove on the stationary part of the check valve if desired, as shown in Fig. 4. The same type of groove is employed so that the gasket will be retained in place. Chamber 26 communicates with passages 34 which extend to the exterior of the body 21 and are disposed above the shoulder 25 in the bore 23. The lower end of the body 21 has an annular groove 35 formed therein for the reception of a gasket or packing ring 36 which is utilized to prevent communication between the outer end of the bore 24 and the passages 34 when the body 21 is inserted in a suitable support.

From Fig. 1 it will be noted that when the gasket 31 is properly positioned on the body 27, the side of the gasket will project beyond the end surface of the body 27 so that when the latter is moved toward the seat 25 such seat will be first engaged by the side of the gasket. Continued movement of the body will then cause the engagement of the end thereof with the seat 25 as shown in Fig. 2. This engagement provides a complete groove in which the O ring gasket 31 will be confined. Since a higher pressure generally exists in the chamber 26 than in the outlet bore section 24, this pressure will be applied as indicated by the arrows in Fig. 2, to the outer side of the gasket 31 and will tend to force the gasket more firmly into the groove to seal the joint between the member 27 and the seat. Since metal to metal contact is secured between the member 27 and the seat, the gasket will be prevented from extruding toward the passage 24. The body 27 is normally urged toward the seat by a coil spring 37 disposed in a socket 38 formed in the body 27 and held therein by a plug 40 which is threaded into the outer end of the bore 23.

Figure 3:
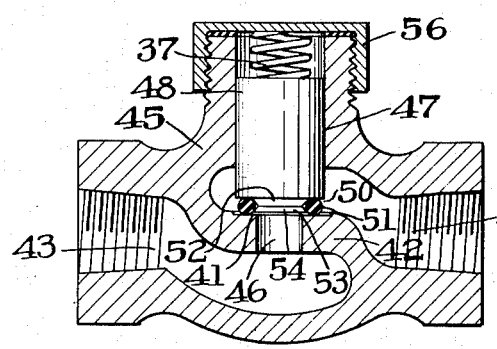
Fig. 3 is a vertical longitudinal sectional view taken through a modified form of the check valve, the principles of the invention being incorporated therein.

In the modified form of the invention shown in Fig. 3, seat 41 is formed in a partition wall 42 which divides the inlet and outlet passages 43 and 44 in the valve body 45. Seat 41 extends around a port 46 formed in the partition 42, the seat and the port being disposed in alignment with a guide bore 47 formed in the body 45. This guide bore 47 slidably receives the movable element 48 which corresponds with the movable body 27 in the form of the invention first described. The element 48 has a half groove 50 at its lower end for the reception of an O ring washer 51. The half groove 50 may be shaped similar to the groove on the movable body 27 in the first form of the invention or it may be formed as shown in Fig. 3 with angularly related plane surfaces 52 and 53 which provide an overhanging bead or flange 54 to retain the gasket 51 on the body 48. As in the first form of the invention, the side of the gasket 51 projects a slight distance beyond the end surface of the body 48 so that the seat 41 will be engaged by the gasket before the engagement of the body 48 therewith. The gasket will thus be slightly compressed before the seat is engaged by the body. A coil spring 55 is employed to yieldably maintain the member 48 in port closing position, the spring engaging the under side of a cap 56 which closes the upper end of the bore 47. When the gasket is carried by the stationary body of the valve as illustrated in Fig. 4, the movable element 57 may take the form of a flat plate or disc or a cylindrical member with a flat end surface may be used.

While the form of embodiment of the present invention as herein disclosed constitutes a preferred form, it is to be understood that other forms might be adopted, all coming within the scope of the claims which follow:

I claim:

1. A check valve comprising a body provided with a bore reduced intermediate of its length to form a shoulder and a passage communicating with the larger section of said bore, a second body movably disposed in the larger section of said bore, said second body having a groove in the side wall around the end nearest said shoulder, said groove also being open toward the end of said second body; a rubber ring having a round cross-section arranged in said groove, said ring engaging said shoulder prior to the engagement thereof by the second body when the latter is moved toward the shoulder; cap means closing the end of the larger section of said bore; and spring means between said cap means and said second body.

2. In a check valve, a casing having a seat; a body disposed in said casing and movable toward and away from said seat, the end of said body nearest said seat being reduced to provide a circular boss with a concave side wall; and a ring of resilient material surrounding said boss and closely engaging the same, the cross sectional diameter of said ring being greater than the length of said boss to extend slightly beyond the end thereof for engagement with said seat prior to the engagement of the body therewith, the unreduced portion of said body extending at least to the periphery of said ring.

CECIL E. ADAMS.

REFERENCES CITED

The following references are of record in the file of this patent:

UNITED STATES PATENTS

| Number | Name | Date |
| --- | --- | --- |
| 820,239 | Moss | May 8, 1906 |
| 839,854 | Jones | Jan. 1, 1907 |
| 874,652 | Bailey | Dec. 24, 1907 |
| 941,760 | Cordley | Nov. 30, 1909 |
| 1,146,247 | Grisenthwaite | July 13, 1915 |
| 1,914,737 | Elms | June 20, 1933 |
| 2,002,672 | Melott | May 28, 1935 |
| 2,316,480 | White | Apr. 13, 1943 |
| 2,343,901 | Groves | Mar. 14, 1944 |
| 2,397,269 | Kelly | Mar. 26, 1946 |